June 25, 1968  J. L. POAGE  3,389,691
ANIMAL HOLDER AND POSITIONER
Filed Aug. 5, 1966  3 Sheets-Sheet 1
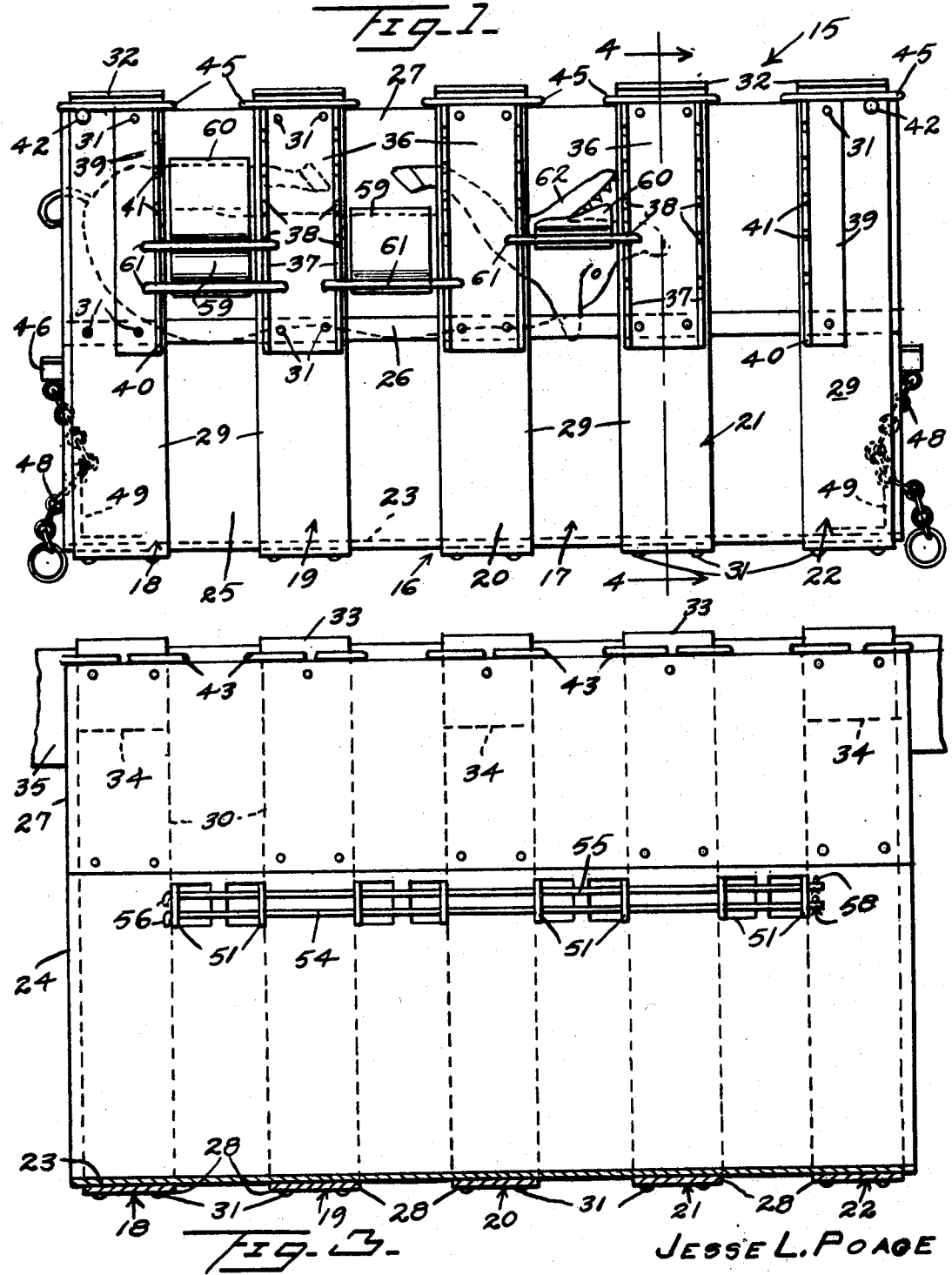

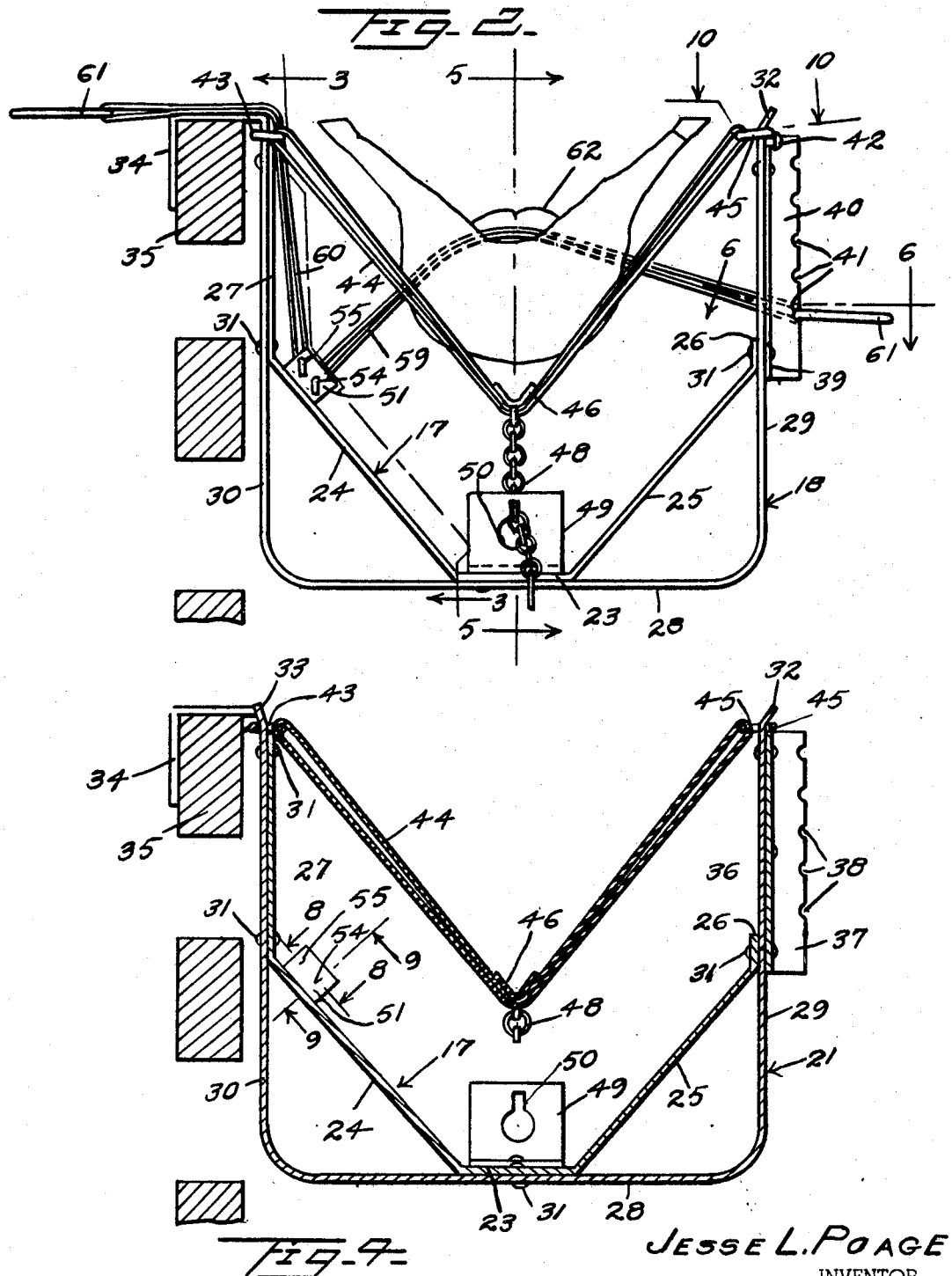

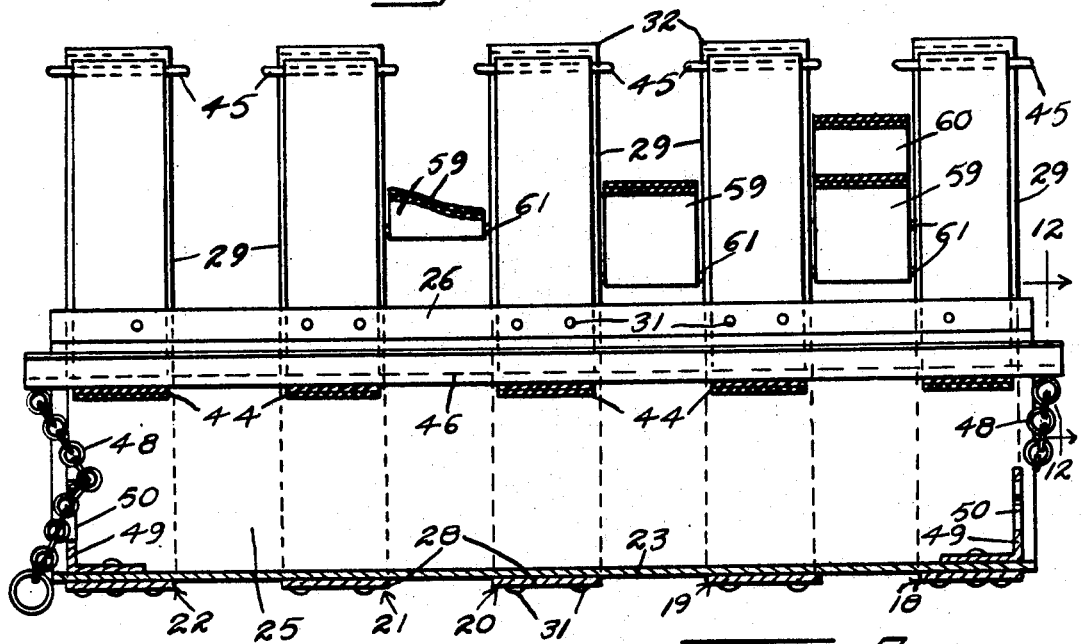
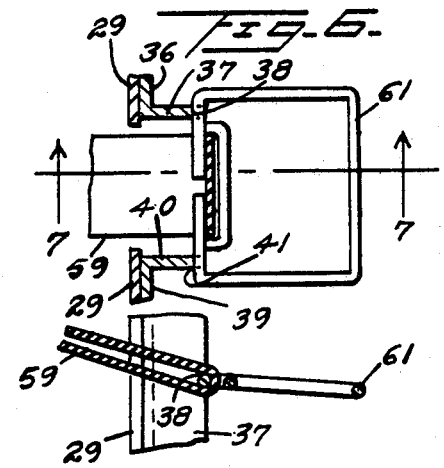
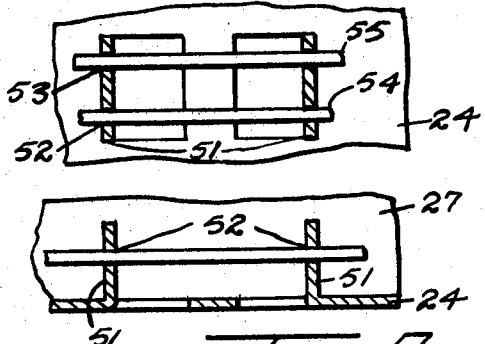
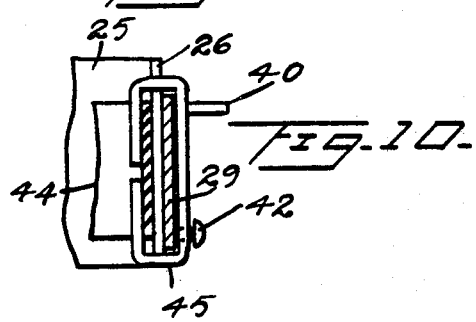
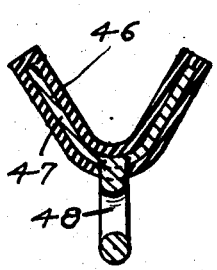

_United States Patent Office_

3,389,691
Patented June 25, 1968

3,389,691
ANIMAL HOLDER AND POSITIONER
Jesse L. Poage, R.F.D. 2, Perry, Mo. 63462
Filed Aug. 5, 1966, Ser. No. 570,555
7 Claims. (Cl. 119—103)

This invention relates to a novel apparatus for holding an animal while various operations are performed on the animal and is especially adapted for holding young pigs and lambs while castrating, while the wolf teeth are being cut off of young pigs, or while various other operations are being performed.

More particularly, it is an object of the invention to provide a holder and positioner including an elastic or yieldable cradle-like support in which the animal is supported within the holder and which yields to conformably fit the contour of the body of the animal regardless of the shape or size of the animal.

A further object of the invention is to provide a holder and positioner including elastic restraining elements which engage over the body of the animal and which are adjustable for engaging different portions of the animal for exposing any desired part of the animal on which work is to be performed.

Still a further object of the invention is to provide a holder and positioner wherein the yieldable cradle-like support includes parts which are spaced longitudinally of the animal and staggered relative to the longitudinally spaced elastic restraining elements, whereby a portion of the animal, located between the elastic support elements, will be caused to bulge into said spaces to prevent lengthwise movement of the animal in the holder while confined by the restraining elements.

A further object of the invention is to provide a holder and positioner that is so constructed that the body of the animal is in contact only with yieldable elements to provide a device which is most humane and causes a minimum of discomfort to the animal.

Still another object of the invention is to provide a holder and positioner the elastic elements of which can be readily released when not in use to minimize reduction of the elasticity of said parts, and wherein the elastic restraining elements can be readily applied and released to facilitate the securement of an animal in the holder.

Another object of the invention is to provide a holder and positioner the elastic parts of which may be readily replaced and wherein the restraining elements are individually adjustable for applying different pressures to desired portions of the animal's body.

Various other objects and advantages of the invention will hereinafter become more fully apparent from the following description of the drawings illustrating a presently preferred embodiment thereof, and wherein:

FIGURE 1 is a side elevational view of the animal holder and positioner, looking toward the front side thereof;

FIGURE 2 is an end elevational view thereof looking from left to right of FIGURE 1;

FIGURE 3 is a longitudinal sectional view taken substantially along the line 3—3 of FIGURE 2, with certain of the parts omitted;

FIGURE 4 is a cross sectional view taken substantially along a plane as indicated by the line 4—4 of FIGURE 1, with certain of the parts omitted and the other parts broken away;

FIGURE 5 is a fragmentary longitudinal sectional view taken substantially along a plane as indicated by the line 5—5 of FIGURE 2;

FIGURE 6 is an enlarged fragmentary sectional view taken substantially along the line 6—6 of FIGURE 2;

FIGURE 7 is a sectional view taken substantially along a plane as indicated by the line 7—7 of FIGURE 6;

FIGURE 8 is an enlarged fragmentary sectional view taken substantially along a plane as indicated by the line 8—8 of FIGURE 4;

FIGURE 9 is an enlarged fragmentary sectional view taken substantially along a plane as indicated by the line 9—9 of FIGURE 4;

FIGURE 10 is an enlarged fragmentary sectional view taken substantially along the line 10—10 of FIGURE 2;

FIGURE 11 is a fragmentary side elevational view of one element of the device, and FIGURE 12 is an enlarged cross sectional view, taken substantially along the line 12—12 of FIGURE 5.

Referring more specifically to the drawings, the animal holder and positioner in its entirety is designated generally 15 and includes a rigid frame, designated generally 16, which is composed of an elongated base member 17 and a plurality of U-shaped members 18, 19, 20, 21 and 22.

The rigid base member 16, as best seen in FIGURES 2 and 4, includes a bottom portion which is substantially V-shaped in cross section and which is composed of a relatively narrow flat bottom part 23, an upwardly and outwardly inclined rear part 24, and an upwardly and outwardly inclined front part 25. The front part 25 terminates in a narrow upright flange 26, and the rear part 24 terminates in an upright wall 27. Parts 23–27 of the base member 17 all extend from end-to-end of the frame 16.

The U-shaped members 18–22 are all disposed crosswise of the base member 17 and each embraces a part thereof, as seen in FIGURES 2 and 4. Each of said U-shaped members includes a substantially flat bottom portion 28, an upright front leg 29 and an upright rear leg 30. The lengths of the legs 29 and 30 are substantially equal to one another and to the length of the bottom portion 28 so that the U-shaped members each have a heighth equal to the width thereof. The intermediate bottom portion 23 of the base member 17 rests upon the bottom portions 28 of all of the U-shaped members and is secured thereto by suitable fastenings such as rivets 31. The flange 26 bears against the inner sides of all of the front legs 29 and is secured thereto by additional fastenings 31, and the rear wall 27 bears against the inner sides of all of the rear legs 30 and is secured thereto by other fastenings 31. Each of the front legs 29 have an outwardly flared upper end 32, and the rear legs 30 of the members 19 and 21 have similar outwardly flared upper ends 33. The rear legs 30 of the members 18, 20 and 22 have rearwardly turned back extensions at their upper ends forming hooks 34 for engagement over the top rail 35 of a fence for detachably mounting the holder and positioner 15 thereon.

Plates 36 as secured to the front sides of the legs 29 of the members 19, 20 and 21 by certain of the fastenings 31 and additional fastenings 31 and have outturned side edge portions forming outwardly or forwardly projecting flanges 37 which are provided with vertically spaced notches 38 in their outer edges. The front legs 29 of the members 18 and 22 each has a narrower plate 39 secured to its front side and longitudinally thereof by fastenings 31 and which has a single outturned side edge portion 40 which is disposed adjacent the inner edge of said leg 29 and which has vertically spaced notches 41, corresponding to and disposed in the same horizontal planes as the notches 38. A pin or stud 42 projects outwardly from each of the last mentioned legs 29, adjacent its outer vertical edge, at approximately the level of the upper end of the flange 40 of said leg, as best seen in FIGURE 10.

Elongated split loops 43 are engaged over the hooks 34 and flared ends 33 to engage the upper ends of the rear legs 30 and to rest on the upper edge of the rear wall 27, as seen in FIGURES 2, 3 and 4. The base member 17 extends slightly beyond the two end members 18 and 22 for supporting the outer ends of the two end loops 43, as seen in FIGURE 3. The loops 43 each engages an end of an endless elastic strap 44 which is preferably formed of rubber, and which has a corresponding split loop 45 attached to its opposite end. The split loops 45 engage over the flared upper ends 32 of the front legs 29. The three intermediate loops 45 rest on the upper ends of the flanges 37 and the two end loops 45 rest on the upper ends of the flanges 40 and on the studs 42, as seen in FIGURE 1. The loops 43 and 45 of the same strap 44 engage the legs 30 and 29 of the same U-shaped member, so that said straps are disposed crosswise of the frame 16 and in alignment with the U-shaped members, as seen in FIGURE 5.

An elongated rigid member 46 of V-shape in cross section and which is enclosed in a rubber casing 47, as seen in FIGURE 12, extends lengthwise of the frame 16 and rests on the intermediate portion of each of the straps 44. A chain 48 is attached to and extends downwardly from each end of the member 46. The chains 48 are disposed beyond the two end straps 44, as seen in FIGURE 5. A bracket 49 is fastened to and extends upwardly from each end of the bottom portion 23 and is disposed crosswise thereof and has an inverted keyhole-shaped opening 50 through which one of the chains 48 extends. The chains 48 are adjustably anchored in the restricted upper portions of the openings 50 for holding the member 46 at any desired elevation thereabove to maintain a desired and uniform tension on the strap members 44.

As seen in FIGURE 3, four pairs of brackets 51 are formed by tongues which are cut on three sides and bent to extend upwardly from the rear bottom 24, beneath and adjacent the rear wall 27, as best seen in FIGURES 8 and 9. The pairs of brackets 51 are disposed between the U-shaped members 18–22 and are each provided with a bottom opening 52 and a top opening 53, as best seen in FIGURE 8. A rod 54 engages through all of the openings 52 and a corresponding rod 55 engages through all of the openings 53, as best seen in FIGURE 3. Said rods are identical and each has an angularly turned end forming a handle 56 and an opening 57 adjacent its opposite end for receiving a cotter pin 48. The cotter pins 58 are removable for removing the rods from the brackets and combined with the handles for retaining the rods applied to the brackets. The lower rod 54 engages through four lower endless elastic straps 59 and the upper rod 55 engages through four corresponding upper endless elastic straps 60. The straps 59 and 60 are disposed on the rods between the brackets of the different pairs of brackets 51 and are thus disposed between the strap members 44, as seen in FIGURE 5. A wire loop-like handle 61 is attached to each strap 59 and 60 at the end thereof disposed remote from the rods 54 and 55.

With the straps 59 and 60 disposed in inoperative positions hanging over the wall 27, an animal 62, such as a baby pig, may be placed in the holder and positioner 15 and supported with its back resting on the elastic straps 44 which thus form a yieldable cradle. As seen in FIGURE 1, the animal 62 is supported by the straps 44 of the U-shaped members 18, 19 and 20; however, larger animals could be supported by all of the straps 44. The bottom restraining straps 59, disposed between the members 18 and 19 and 19 and 20, are passed over the belly of the animal and are twisted so that the handles 61 thereof can be passed outwardly between the front legs 29 of said members and thereafter engaged in selected notches 38 and 41 for securing the restraining straps 59 across the body of the animal and with a desired amount of tension thereon. It will be noted, as seen in FIGURES 1 and 2, that portions of the animal's body will bulge out between the supporting straps 44 on which the body rests, especially when the body is held down by the restraining straps 59, to effectively prevent any lengthwise sliding movement of the animal relative to the supporting straps 44. When certain operations are to be performed on the animal, the hind legs may be left free, as seen in FIGURE 2. For other operations, the hind legs may be held down, as seen in FIGURE 1, by passing the upper restraining strap 60, located between the members 18 and 19, over the hind legs and engaging its handle 61 with a notch 38 and a notch 41. A strap 59 or 60, as seen in FIGURE 1, may be passed through an animal's mouth with its handle secured in two of the notches 38 for holding the mouth open while certain operations are performed, such as removing the "wolf" teeth. If desired, the straps 59 or 60 may be passed diagonally over the animal's body and across the supporting straps 44 and secured by the notches 38 and 41 engaging the handles 61 of said straps, for exposing desired portions of the body for any operations to be performed.

It will also be apparent that the animal can be confined in the holder and positioner resting on either side or resting on its belly. The straps 44 provide a yieldable cradle-like support and, in combination with the restraining straps 59 and 60, provide an elastic means for supporting and positioning the animal wherein the animal is not touched by any rigid element, so as to provide a most humane and comfortable support and restraint.

The loops 45 can be disengaged from the front legs 29 when the holder and positioner is not in use for releasing the tension on the supoprting straps 44, or this can be accomplished by disconnecting the chains 48 from the brackets 49. It will also be apparent that the elastic strap members 44, 59 and 60 can be individually removed and replaced, when required, and that the restraining straps 59 and 60 can be applied with varying pressure by engaging the handles 61 with selected pairs of notches 38 and 41.

Various modifications and changes are contemplated and may be resorted to without departing from the function or scope of the invention as are hereinafter defined by the appended claims.

I claim as my invention:

1. An animal holder and positioner comprising an elongated rigid frame of channel-shaped cross section having an open top and open ends, and a yieldable cradle-like support disposed lengthwise within and suspended by said frame and of substantially V-shape cross section said cradle-like support comprising a plurality of elastic straps each disposed crosswise of the frame and in spaced apart relation to one another, and hold down means extending longitudinally of the frame and engaging intermediate portions of said straps.

2. An animal holder and positioner as in claim 1, and means adjustably anchoring the hold-down means to the frame beneath said cradle-like support for maintaining an uniform tension on all of said straps.

3. An animal holder and positioner as in claim 1, and a plurality of elastic restraining elements connected to said frame and extending thereacross between said straps and adapted to engage over portions of the body of an animal resting in said cradle-like support for confining the animal therein.

4. An animal holder and positioner as in claim 3, and means detachably and adjustably connecting an end of each of said restraining elements to a part of the frame for adjustably locating said restraining elements relative to the frame and for varying the tension applied to the individual restraining elements.

5. An animal holder and positioner as in claim 4, said frame including a front part provided with slot-like openings located between said straps for affording access to the animal and through which portions of said restraining elements extend.

6. An animal holder and positioner as in claim 2, and means detachably connecting the straps and restraining elements to the frame to facilitate selective replacement of said parts.

7. An animal holder and positioner as in claim 1, said frame having downwardly opening hook members projecting from one side thereof and adapted to engage a fence rail for mounting the holder and positioner thereon.

References Cited

UNITED STATES PATENTS

| | | | |
|---|---|---|---|
| 1,451,826 | 4/1923 | Hobbs | 119—103 |
| 1,746,115 | 2/1930 | Hermanni | 119—103 |
| 2,183,470 | 12/1939 | Speckels | 119—103 |
| 2,705,475 | 4/1955 | Jonisee | 119—103 |
| 2,708,422 | 5/1955 | Morrison | 119—103 |
| 2,980,060 | 4/1961 | Marsh | 119—103 |
| 3,035,278 | 5/1962 | Golding | 5—317 |
| 3,092,079 | 6/1963 | Strebel et al. | 119—103 |
| 3,186,380 | 6/1965 | Roney | 119—103 |
| 3,229,667 | 6/1966 | Stack | 119—103 |
| 3,250,252 | 5/1966 | Leopold | 119—103 |

ALDRICH F. MEDBERY, *Primary Examiner.*